US012735872B2

(12) United States Patent
Hodel et al.

(10) Patent No.: US 12,735,872 B2
(45) Date of Patent: Sep. 15, 2026

(54) ESTIMATING AND VISUALIZING TERRAIN PARAMETERS FOR EXCAVATION

(71) Applicant: Caterpillar Inc., Peoria, IL (US)

(72) Inventors: Benjamin J. Hodel, Dunlap, IL (US); Adam Martin Nackers, Washington, IL (US); Justin Lee Steinlage, Mackinaw, IL (US); Mo Wei, Dunlap, IL (US); Benjamin Floyd, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 301 days.

(21) Appl. No.: 18/126,865

(22) Filed: Mar. 27, 2023

(65) Prior Publication Data

US 2024/0328125 A1 Oct. 3, 2024

(51) Int. Cl.

| | |
|---|---|
| ***E02F 9/26*** | (2006.01) |
| ***E02F 9/20*** | (2006.01) |
| ***G05D 1/224*** | (2024.01) |

(52) U.S. Cl.

CPC ............ *E02F 9/262* (2013.01); *E02F 9/2029* (2013.01); *E02F 9/2041* (2013.01); *E02F 9/205* (2013.01); *E02F 9/261* (2013.01); *E02F 9/265* (2013.01); *G05D 1/2247* (2024.01)

(58) Field of Classification Search

CPC ....... E02F 9/262; E02F 9/2029; E02F 9/2041; E02F 9/205; E02F 9/265; E02F 9/261; E02F 9/264; G05D 1/0038

See application file for complete search history.

(56) References Cited

U.S. PATENT DOCUMENTS 6,363,632 B1 4/2002 Stentz et al.
8,351,684 B2 1/2013 Clar et al.
8,364,405 B2 1/2013 Sprock et al.

(Continued)

FOREIGN PATENT DOCUMENTS

JP 2022108814 A * 7/2022
WO 2022145498 A1 7/2022

OTHER PUBLICATIONS

Machine translation of foreign reference (JP2022108814) (Year: 2022).*

(Continued)

*Primary Examiner* — Anne Marie Antonucci
*Assistant Examiner* — Nicholas Patrick Langhorne

(57) ABSTRACT

Autonomous systems enable a machine, such as an excavator, to dig in a specified area with little to no human intervention. However, conventional autonomous systems require costly exteroceptive systems to monitor the terrain surface during the autonomous dig operation. Accordingly, embodiments are disclosed for estimating a terrain surface using only proprioceptive sensors, such as the linkage sensors on the work implement of an excavator. The terrain surface may be estimated by fitting a surface to one or more touchpoints collected using the work implement. The estimated terrain surface may be updated during a dig operation using a model of material flow and/or by collecting additional touchpoints. Embodiments enable a remote operator to visualize this terrain surface in a camera view by projecting the estimated terrain surface onto an image plane with a representation that depicts one or more terrain parameters.

20 Claims, 7 Drawing Sheets

(56) References Cited

U.S. PATENT DOCUMENTS

| | | | |
|---|---|---|---|
| 8,706,363 | B2 | 4/2014 | Stratton et al. |
| 9,300,954 | B2 | 3/2016 | Tanizumi et al. |
| 9,824,490 | B1 * | 11/2017 | Côté .................... G06T 19/006 |
| 10,248,133 | B2 | 4/2019 | Stratton et al. |
| 10,829,911 | B2 * | 11/2020 | Kennedy ................ G06V 20/38 |
| 10,975,551 | B2 * | 4/2021 | Uji .......................... G07C 5/02 |
| 11,236,492 | B1 | 2/2022 | Ready-Campbell et al. |
| 2004/0210370 | A1 | 10/2004 | Gudat et al. |
| 2011/0148856 | A1 | 6/2011 | Sprock et al. |
| 2016/0024757 | A1 * | 1/2016 | Nomura ................ E02F 9/2054 701/32.3 |
| 2018/0137446 | A1 | 5/2018 | Shike et al. |
| 2020/0105072 | A1 | 4/2020 | Wisley et al. |
| 2020/0123735 | A1 * | 4/2020 | Stotlar .................... E02F 3/841 |
| 2020/0240117 | A1 | 7/2020 | Cheng et al. |
| 2023/0313503 | A1 * | 10/2023 | Hayakawa .............. E02F 9/261 701/31.4 |

OTHER PUBLICATIONS

JP 2022108814 machine translation (Year: 2022).*

A. Rasul, A. Khaicnour and J. Seo, “Effective Ground Mapping for Autonomous Excavation,” 2021 21st International Conference on Control, Automation and Systems (ICCAS), Jeju, Korea, Republic of, 2021, pp. 1087-1092, doi: 10.23919/ICCAS52745.2021.9650067. (Year: 2021).*

* cited by examiner

ESTIMATING AND VISUALIZING TERRAIN PARAMETERS FOR EXCAVATION

TECHNICAL FIELD

The embodiments described herein are generally directed to autonomous excavation, and, more particularly, to estimating and visualizing terrain parameters (e.g., representing a terrain surface) for autonomous excavation using proprioception.

BACKGROUND

Systems exist for the remote operation of an excavator without a line of sight to the excavator. The remote operator may manually perform a dig operation, but this can be difficult and time-consuming. Thus, depth-perception systems have been developed that enable an excavator to sense a terrain in three dimensions using exteroception, such that the excavator can autonomously perform a dig operation on the terrain.

However, depth-perception systems require costly sensing technologies, such as radio detection and ranging (RADAR) and light detection and ranging (LIDAR), and therefore, are expensive. Depth-perception systems are also prone to failure in noisy environments, such as a mine site. For example, something as simple as dust can prevent a depth-perception system from sensing and monitoring the surface of the terrain.

The inventors have recognized that, instead of an expensive depth-perception system, proprioception can be used to estimate the terrain surface. As used herein, the term "proprioception" refers to the use of machine sensors, such as linkage sensors, to estimate the terrain surface, as opposed to a ranging system that is capable of sensing the three-dimensional environment around the machine.

Even so, the remote operator only has a two-dimensional camera view of the terrain. The remote operator is unable to interact with the estimated terrain surface, for example, to correct or improve the estimate and/or view the estimated terrain surface. In addition, when the remote operator returns from having been away from the camera view during an autonomous dig operation, the remote operator may not be able to quickly determine where the excavator is having difficulty digging and/or what material remains to be dug.

The present disclosure is directed toward overcoming one or more of the problems discovered by the inventors.

SUMMARY

In an embodiment, a method comprises using at least one hardware processor to: generate one or more touchpoints from an output of one or more linkage sensors on a machine, wherein each of the one or more touchpoints comprises a three-dimensional coordinate, and wherein the output represents a characteristic of a work implement of the machine; determine a terrain surface from the one or more touchpoints; generate a two-dimensional visual representation of the terrain surface by projecting the terrain surface onto an image plane; and augment a camera view with the two-dimensional visual representation of the terrain surface.

In an embodiment, a system comprises: at least one hardware processor; and software that is configured to, when executed by the at least one hardware processor, generate one or more touchpoints from an output of one or more linkage sensors on a machine, wherein each of the one or more touchpoints comprises a three-dimensional coordinate, and wherein the output represents a characteristic of a work implement of the machine, determine a terrain surface from the one or more touchpoints, generate a two-dimensional visual representation of the terrain surface by projecting the terrain surface onto an image plane, and augment a camera view with the two-dimensional visual representation of the terrain surface.

In an embodiment, a non-transitory computer-readable medium has instructions stored thereon, wherein the instructions, when executed by a processor, cause the processor to: generate one or more touchpoints from an output of one or more linkage sensors on a machine, wherein each of the one or more touchpoints comprises a three-dimensional coordinate, and wherein the output represents a characteristic of a work implement of the machine; determine a terrain surface from the one or more touchpoints; generate a two-dimensional visual representation of the terrain surface by projecting the terrain surface onto an image plane; and augment a camera view with the two-dimensional visual representation of the terrain surface.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

Figure 1:
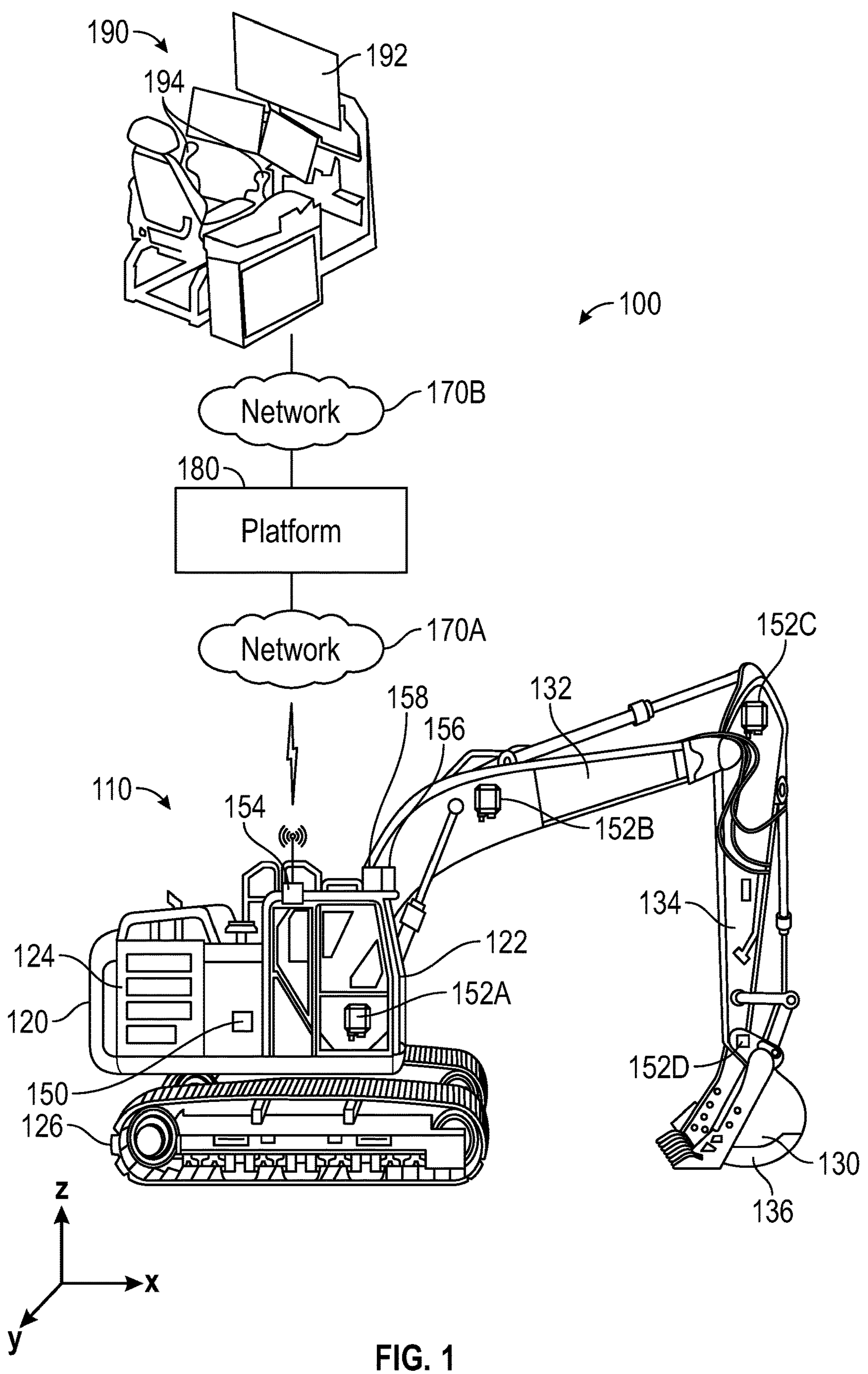
FIG. 1 illustrates remote operation of a machine in a machine environment, according to an embodiment.

FIG. 1 illustrates remote operation of a machine 110 in a machine environment 100, according to an embodiment. Machine environment 100 may include an environment in which one or more machines 110 perform a task associated within an industry, such as mining, construction, transportation, energy exploration, farming, or the like. For example, machine environment 100 could include one or more mine sites in which a plurality of machines 110 cooperate to perform a task associated with mining. However, it should be understood that disclosed embodiments are not limited to any particular environment. In addition, while machine 110 is illustrated as a hydraulic excavator, it should be understood that machine 110 may be any type of machine capable of excavation, including an electric rope shovel, hydraulic mining shovel, or the like.

In the illustrated example, machine 110 comprises a machine body 120 and a work implement 130. Machine body 120 may comprise a cabin 122, an engine 124, and ground-engaging members 126. Cabin 122 may comprise a seat for an operator, as well as controls (e.g., integrated joystick(s), keyboard, etc.), a console (e.g., an integrated display with inputs), and/or the like. Ground-engaging members 126 are illustrated as tracks, but may comprise other types of components for moving machine body 120 with respect to the ground, such as wheels, rollers, and/or the like. Ground-engaging members 126 may be driven by a drivetrain, which is in turn driven by engine 124. Work implement 130 is illustrated as an arm, comprising a boom 132 and stick 134, and a bucket 136 attached to the end of stick 134. Boom 132, stick 134, and bucket 136 may rotate or otherwise move, relative to each other, by way of hydraulic cylinders. Alternatively, work implement 130 could comprise a shovel or any other type of tool capable of excavation. Thus, while work implement 130 will be described as utilizing a bucket 136 to dig and carry material, it should be understood that bucket 136 may be any type of apparatus capable of digging and carrying material, regardless of whether or not that apparatus is commonly referred to as a "bucket."

Machine 110 may comprise an electronic control unit (ECU) 150 that is communicatively coupled (e.g., via wired or wireless communications) to one or a plurality of sensors 152A-D (which may be collectively referred to herein as sensor(s) 152) and/or subsystems of machine 110. While referred to herein as a single component, ECU 150 may be a network of components. ECU 150 may collect data from sensor(s) 152 and/or subsystems of machine 110 and process the collected data. Processing the collected data may comprise determining a position of work implement 130, determining one or more machine states from the collected data, generating an alert based on the collected data (e.g., if a value of a parameter in the data satisfies a predefined threshold), filtering, analyzing, sorting, correlating, storing, and/or relaying the collected data, and/or the like. ECU 150 may also control the operation of one or more subsystems of machine 110 based on the collected data and/or operator commands. For example, ECU 150 may be communicatively coupled to a fuel injection system associated with engine 124 of machine 110. ECU 150 may receive an operator command (e.g., increase throttle) and provide command signals to the fuel injection system of engine 124, which may responsively increase the flow of fuel from a fuel supply to engine 124. Engine 124 may be connected to a torque converter that transmits power from engine 124 to a transmission of the drivetrain that drives ground engaging members 126, to thereby move machine 110 with respect to the ground.

Sensor(s) 152 may include any type of sensor or sensor array capable of measuring values of one or more parameters of one or more subsystems of machine 110 and/or machine environment 100. Examples of such parameters include, without limitation, relative position(s) of one or more components of work implement 130 (e.g., boom 132, stick 134, bucket 136, etc.), engine speed, machine speed, location of machine 110 (e.g., coordinates acquired via a global navigation satellite system (GNSS), such as the Global Positioning System (GPS)), pressure of a fluid (e.g., fuel, oil, coolant, etc.), flow rate of a fluid, temperature of a fluid, contamination level of a fluid, viscosity of a fluid, electric current, electric voltage, fluid consumption rates, loading level, transmission output ratio, slip, grade, traction, mileage, time or mileage until or since scheduled maintenance, and/or the like. In an embodiment, sensors 152 comprise linkage sensors whose output represents a characteristic of work implement 130. For example, a linkage sensor may measure a position of a component of work implement 130, such as boom 132, stick 134, and/or bucket 136, relative to another component of machine 110, such as ground-engaging members 126 and/or another component of work implement 130 (e.g., angle of boom 132 relative to ground-engaging members 126, angle of stick 134 relative to a longitudinal axis of boom 132, angle of bucket 136 relative to a longitudinal axis of boom 134, etc.). Sensors 152 may also comprise a pitch sensor that measures the pitch angle of the chassis relative to the inertial frame, a roll sensor that measures the roll angle of the chassis relative to the inertial frame, and/or the like. A sensor 152 may comprise an inertial measurement unit (IMU), hydraulic cylinder displacement sensor, joint angular sensor, or other appropriate sensor.

Machine 110 may comprise a communication module 154, which may be separate or integral to ECU 150. Communication module 154 may comprise hardware and/or software that enables communication between communication module 154 and an access point of a network 170A. For example, communication module 154 may comprise or be connected to a processor, network interface, and wireless transceiver with an antenna that enables wireless communication with a base station of a cellular network. Communication module 154 may send data to a platform 180 and/or receive data from platform 180 via network 170A. For example, ECU 150 may transmit any of the data that is collected (e.g., from sensor(s) 152) or derived from collected data to platform 180 via communication module 154, as well as receive data, such as control commands, from platform 180 via communication module 154.

Machine 110 may comprise one or more cameras 156. Camera(s) 156 may comprise monocular camera(s). Each camera 156 captures video of a field of view of an area around machine 110. For example, a forward-facing camera 156 may capture a front field of view of an area in front of machine 110, including a view of work implement 130, a right-side-facing camera 156 may capture a right field of view of an area to the right of machine 110, a left-side-facing camera 156 may capture a left field of view of an area to the left side of machine 110, and a rear-facing camera 156 may capture a rear field of view of an area in the rear of machine 110. One or more of cameras 156 may be very wide-angle cameras with a field of view of 120-degrees or greater (e.g., between 120-degrees and 180-degrees). Different cameras 156 may have same-sized fields of view or differently sized fields of view. In an embodiment, each camera 156 has a maximum field of view that can be narrowed by mechanical, electronic, and/or software means, including in the captured video by software-based correction to eliminate fisheye distortion (e.g., using rectilinear projection). Thus, the field of view that appears in the final video (i.e., intended for viewing by an operator) from each camera 156 may represent the maximum field of view or some angle less (e.g., less than 120-degrees) than the maximum field of view.

Each camera 156 may stream or otherwise transmit the captured video, comprising a plurality of image frames, to platform 180 via communication module 154. Camera(s)

156 may transmit the video directly to communication module 154. Alternatively, camera(s) 156 may transmit the video to ECU 150, which may relay the video in real time (e.g., with or without pre-processing) to platform 180 through communication module 154. As used herein, the term "real time" or "real-time" encompasses events that occur simultaneously, as well as events that are temporally separated by ordinary delays resulting from processing latencies, network latencies, and/or the like. It is generally contemplated that the camera view of each camera 156 will substantially represent a view that a local operator would see from cabin 122, but offset due to the positioning of camera 156 out of a local operator's line of sight from cabin 122.

Machine 110 may also optionally comprise one or more three-dimensional (3D) sensors 158 configured to acquire 3D data about the terrain within at least the field of view of one of camera(s) 156. For example, 3D sensor(s) 158 may comprise a stereo camera, configured to acquire 3D data within a field of view of a forward-facing camera 156. A stereo camera comprises two or more lenses, separated by a distance (e.g., corresponding to a human intra-ocular distance), with a separate image sensor for each lens. A stereo camera simulates human binocular vision to capture stereographic images (i.e., images whose perspectives are shifted with respect to each other by the distance between the lenses of the stereo camera). Alternatively or additionally, 3D sensor(s) 158 may comprise a RADAR system, a LIDAR system, a time-of-flight camera, an interferometer, and/or the like. However, the benefits of disclosed embodiments may be obtained without the need for such costly depth-perception systems.

Cabin 122 may comprise a display console (not shown). The display console may comprise a plasma display, light-emitting diode (LED) display, liquid crystal display (LCD), and/or the like. In an embodiment, the display console may comprise an integrated touch sensor to form a touch panel display which may both display data and receive touch inputs at positions on the display from a local operator within cabin 122. Alternatively or additionally, the display console may receive inputs via other input means, such as joysticks, keyboards, in-cabin cameras, biometric sensing devices, computer mice, trackballs, pen-based pointing devices, and/or the like. The display console may be communicatively coupled to ECU 150, communication module 154, and/or camera(s) 156. Thus, the display console may display a graphical user interface which enables a local operator in cabin 122 to view data collected by ECU 150 (e.g., real-time values of parameters of one or more subsystems of machine 110), data derived from data collected by ECU 150 (e.g., machine states, alerts, graphs, charts, tables, etc.), and/or data received from platform 180 via communication module 154, view video captured by camera(s) 156, interact with one or more software applications executed on-board machine 110 (e.g., within ECU 150), perform an audio or audiovisual communication with another person, and/or the like. A local operator in cabin 122 may utilize the display console to view the surroundings of machine 110 via camera(s) 156, access operator assistance tools, receive alerts, dispatch information, operational instructions, and/or recommendations, review environmental data (e.g., weather, temperature, soil conditions, etc.), payload information, productivity data, and/or any other type of information, control one or more subsystems of machine 110 via commands to ECU 150, initiate or receive an audio or audiovisual call, and/or the like.

In an embodiment, video captured by camera(s) 156 is relayed (e.g., with or without pre-processing) to an external system, and, in the illustrated embodiment, through platform 180 to a remote terminal 190. Platform 180 may host and/or execute one or more of the various functions, processes, methods, and/or software modules described herein. Platform 180 may comprise dedicated servers or may instead be implemented in a computing cloud, in which the resources of one or more servers are dynamically and elastically allocated to multiple tenants based on demand. These servers may be collocated (e.g., in a single data center) and/or geographically distributed (e.g., across multiple data centers). Platform 180 may be communicatively connected to machine 110 via network 170A and/or a remote terminal 190 via network 170B. Networks 170A and 170B (which may be collectively referred to herein as network 170) may be the same network, separate and distinct networks, or overlapping networks, and may include one or more cellular networks, one or more satellite networks, the Internet, one or more intranets, and/or the like. While only a single instance of machine 110 and a single instance of remote terminal 190 are illustrated, it should be understood that platform 180 may be communicatively coupled to any number of machines 110 and remote terminals 190.

Platform 180 may comprise one or more web servers which host one or more websites and/or web services. In embodiments in which a website is provided, the website may comprise a graphical user interface, including, for example, one or more screens (e.g., webpages) generated in HyperText Markup Language (HTML) or other language. Platform 180 transmits or serves one or more screens of the graphical user interface in response to requests from machine 110 via network 170A and/or remote terminal 190 via network 170B. These screens may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and/or the like.

In embodiments in which a web service is provided, platform 180 may receive requests from external systems, and provide responses in extensible Markup Language (XML), JavaScript Object Notation (JSON), and/or any other suitable or desired format. In such embodiments, platform 180 may provide an application programming interface (API) (e.g., implemented with a Representation State Transfer (REST) architecture) which defines the manner in which machine 110, remote terminal 190, and/or other external system(s) may interact with the web service. Thus, machine 110, remote terminal 190, and/or other external systems (which may themselves be servers), can define their own user interfaces, and rely on the web service to implement or otherwise provide the backend processes, methods, functionality, storage, and/or the like, described herein. For example, in such an embodiment, a client application, executing on remote terminal 190, may interact with platform 180 to execute one or more or a portion of one or more of the various functions, processes, methods, and/or software modules described herein. In this case, the client application may generate the graphical user interface and access functionality on platform 180 via the API.

Remote terminal 190 may comprise any type of computing device capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. However, it is generally contemplated that remote terminal 190 is a remote operating station by which a remote operator can operate machine 110 through platform 180. In an alternative embodiment, remote terminal 190 may communicate directly with machine 110 (i.e., without platform 180 acting as an intermediary) to operate machine 110. In either case, remote terminal 190 may comprise one or more displays 192 that display, in real time, video captured by camera(s) 156 and transmitted by communication module 154 of machine 110. Remote terminal 190 may also comprise one or more input devices 194 (e.g., joysticks) that enable a remote operator to provide operating controls to machine 110. These operating controls may be transmitted as control commands, directly or via platform 180, to communication module 154, which may relay the control commands to ECU 150. ECU 150 may responsively control the appropriate subsystem of machine 110 in accordance with the control commands. Thus, the remote operator may control machine 110 (e.g., work implement 130) in the same or similar manner as a local operator in cabin 122 and have access to the same or similar data and functionality as a local operator in cabin 122. In general, for safety reasons, each remote terminal 190 should control one machine 110 at a time. However, this is not a requirement of any embodiment. As illustrated, display(s) 192 and input(s) 194 may be configured to simulate cabin 122 of machine 110.

Figure 2:
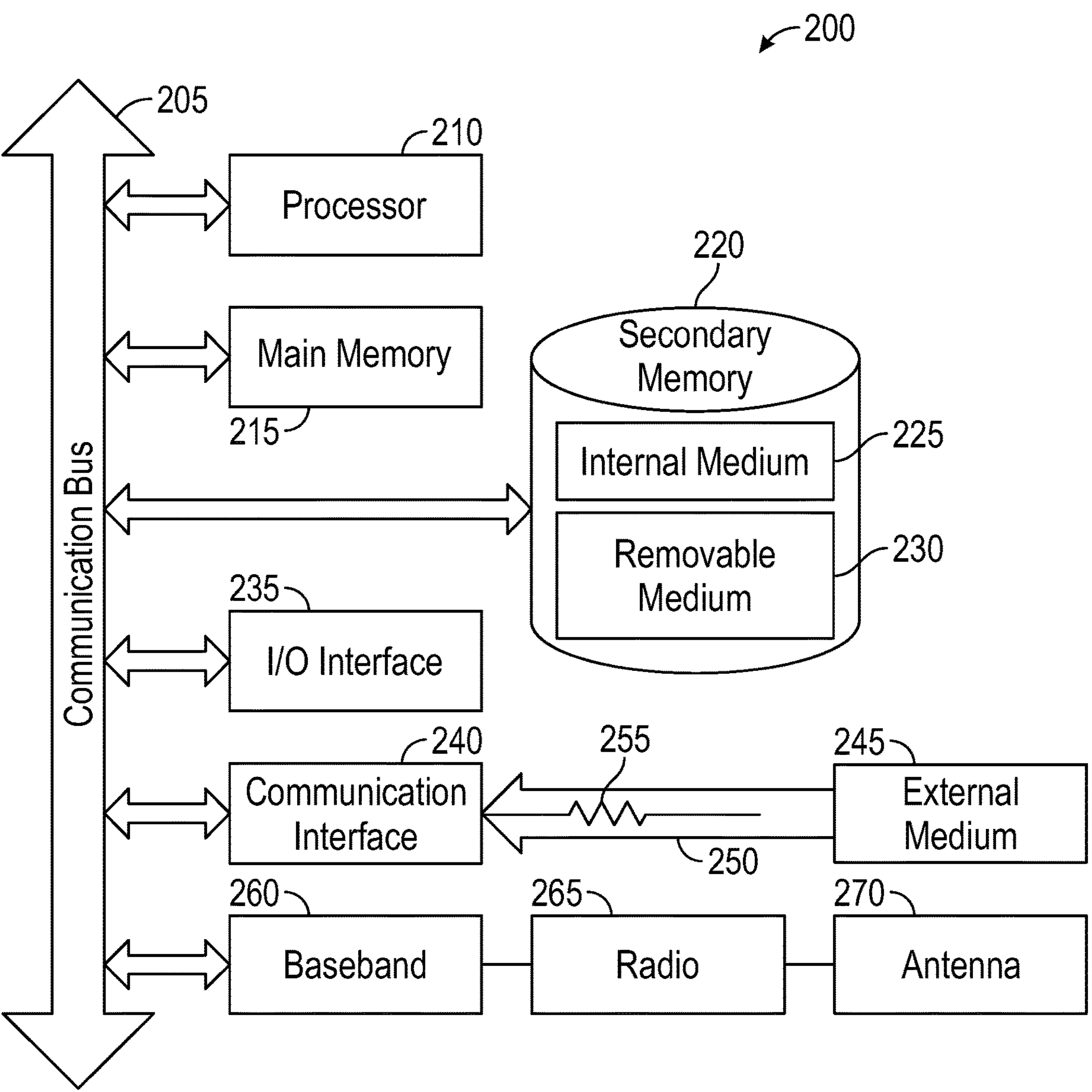
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods described herein (e.g., to store and/or execute the implementing software), and may represent components of machine 110 (e.g., ECU 150, communication module 154, camera(s) 156, the display console in cabin 122, etc.), platform 180, remote terminal 190, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE), and/or the like.

System 200 preferably includes a main memory 215 and may also include a secondary memory 220. Main memory 215 provides storage of instructions and data for programs executing on processor 210, such as any of the software discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 is a non-transitory computer-readable medium having computer-executable code (e.g., any of the software disclosed herein) and/or other data stored thereon. The computer software or data stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), flash memory (block-oriented memory similar to EEPROM), and the like.

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and the like.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., the display console, or in a smartphone, tablet computer, or other mobile device).

System 200 may include a communication interface 240. Communication interface 240 allows software and data to be transferred between system 200 and external devices (e.g. printers), networks (e.g., network(s) 170), or other information sources. For example, computer software or executable code may be transferred to system 200 from a network server (e.g., platform 180) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 170) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 170), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed software) is stored in main memory 215 and/or secondary memory 220. Computer-executable code can also be received via communication interface 240 and stored in main memory 215 and/or secondary memory 220. Such computer programs, when executed, enable system 200 to perform the various functions of the disclosed embodiments described elsewhere herein.

System 200 may also include optional wireless communication components that facilitate wireless communication over a voice network and/or a data network. The wireless communication components (e.g., corresponding to communication module 154) comprise an antenna system 270, a radio system 265, and a baseband system 260. Baseband system 260 is communicatively coupled with processor(s) 210. In system 200, radio frequency (RF) signals are transmitted and received over the air by antenna system 270 under the management of radio system 265.

In this description, the term "computer-readable medium" is used to refer to any non-transitory computer-readable storage media used to provide computer-executable code and/or other data to or within system 200. Examples of such media include main memory 215, secondary memory 220 (including internal memory 225 and/or removable medium 230), external storage medium 245, and any peripheral device communicatively coupled with communication interface 240 (including a network information server or other network device). These non-transitory computer-readable media are means for providing software and/or other data to system 200.

Figure 3:
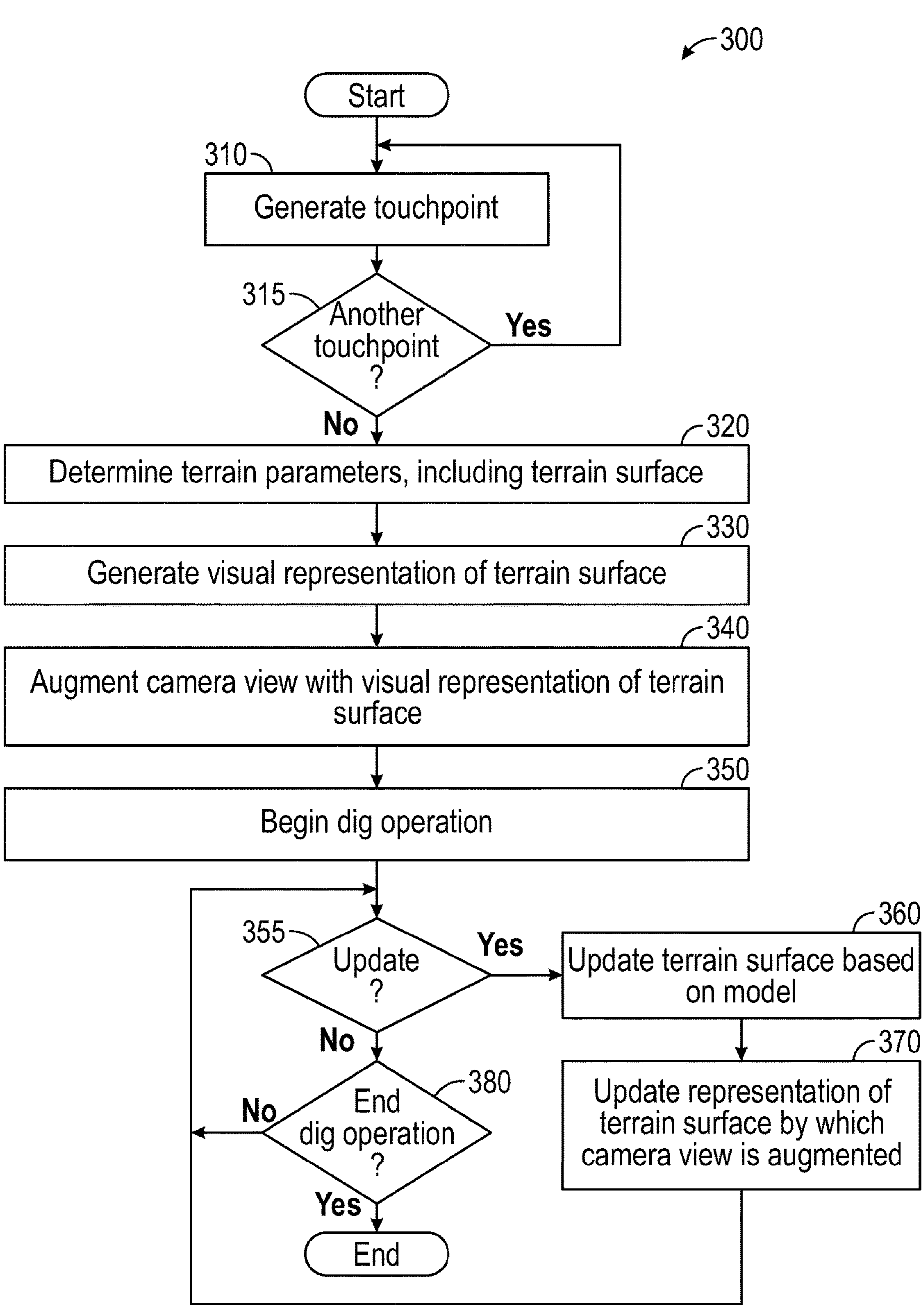
FIG. 3 illustrates a process for estimating and visualizing terrain parameters for autonomous excavation, according to an embodiment.

FIG. 3 illustrates a process 300 for estimating and visualizing terrain parameters for autonomous excavation, according to an embodiment. It is generally contemplated that process 300 would be implemented by platform 180. However, process 300 may alternatively be implemented by ECU 150, remote terminal 190, a combination of platform 180 and ECU 150, a combination of platform 180 and remote terminal 190, a combination of ECU 150 and remote terminal 190, or a combination of ECU 150, platform 180, and remote terminal 190. In any case that process 300 is implemented by a combination of such systems, each system may perform one or more of the subprocesses illustrated in process 300, while the other system(s) may perform the other subprocesses illustrated in process 300.

In subprocess 310, a touchpoint is generated. In particular, the operator of machine 110 (e.g., a remote operator at remote terminal 190 or a local operator in cabin 122) may control work implement 130 to contact a point on the ground. For example, the operator may control work implement 130 to set bucket 136 down on a certain point on the ground. A particular portion of bucket 136, such as the center tooth of bucket 136, the heel of bucket 136, or the like, may be designated as the reference point to place at the desired point on the ground. Once the reference point on bucket 136 is positioned at the desired ground point, the operator may operate an input to create a touchpoint representing the desired ground point. For example, the operator may press a button on a joystick (e.g., 194), press a key on a keyboard, press a virtual button on a touch panel display, gaze at an input on a virtual reality (VR) display or augmented reality (AR) display, or the like. When the input is operated, the output of one or more sensors 152 may be collected (e.g., by ECU 150 and relayed to platform 180), and a touchpoint may be generated from the output of these sensor(s) 152.

In an embodiment, the output that is generated is from a plurality of linkage sensors 152 that measure relative positions of components of work implement 130, such as boom 132, stick 134, and bucket 136. From the relative positions of these components to each other and/or to other components of machine 110, such as ground-engaging members 126, a three-dimensional coordinate may be generated. The three-dimensional coordinate represents the respective ground point in three-dimensional space, according to a coordinate system defined for the space surrounding machine 110. Thus, each touchpoint may comprise a three-dimensional coordinate within the coordinate system.

The coordinate system may be defined with respect to a reference point on ground-engaging members 126 and a machine plane. The machine plane may be defined as the plane underlying the bottoms of ground-engaging members 126, or in any other suitable manner. The X-axis may be the axis of travel of ground-engaging members 126 within the machine plane. The Y-axis may be an axis within the machine plane and perpendicular to the axis of travel of ground-engaging members 126. The Z-axis may be an elevation or height with respect to the machine plane (i.e., perpendicular to the machine plane). The X-Y-Z coordinates of the reference point on bucket 136 may be determined proprioceptively from linkage sensors 152 and known fixed parameters of work implement 130 using forward kinematics. For example, the X, Y, Z coordinates may be determined based on the known lengths of boom 132, stick 134, and bucket 136, the relative angles of boom 132, stick 134, and bucket 136 to each other, the angle of work implement 130 to ground-engaging members 126, and/or the like.

While the terms X, Y, Z will be used to describe the coordinates and coordinate system herein, it should be understood that, if machine 110 has a rotating work implement 130, a cylindrical coordinate system may be preferred over a Cartesian coordinate system. In this case, the X and Y coordinates may be polar coordinates, consisting of a distance (commonly denoted as "r") from the origin to the point, within the XY-plane, and an angle (commonly denoted as "θ") between the X-axis and a line segment from the origin to the point, within the XY-plane. The Z coordinate is the distance between the point and the XY-plane. For a hydraulic excavator, X or r represents the reach of bucket 136, Y or θ represents the swing of bucket 136, and Z represents the height of bucket 136. It should be understood that any of the three-dimensional points described herein may be represented in either the Cartesian coordinate system or a cylindrical coordinate system. A person of skill in the art will understand how to convert between the two coordinate systems.

In an embodiment, each touchpoint may also comprise or be associated with one or more other terrain parameters, such as a density or compactness of material at the respective ground point. For example, the density of the material may be determined by pressing bucket 136 against the ground at the ground point when collecting the touchpoint, and measuring the hydraulic pressure (e.g., on bucket 136) from a hydraulic cylinder pressure sensor, or some other output from one or more sensors 152, during the press. The sensor output can be used to derive a measure representing the density of the material upon which bucket 136 is pressing. Alternatively, the density of the material at the ground point may be determined by digging a test bucket, being specified by the operator via an input, or any other suitable means. The density of the material generally represents how difficulty the material will be to dig.

In subprocess 315, it is determined whether or not there is another touchpoint to be generated. When another touchpoint is to be generated (i.e., "Yes" in subprocess 315), process 300 returns to subprocess 315 to generate another touchpoint. Otherwise, when no more touchpoints are to be generated (i.e., "No" in subprocess 315), process 300 proceeds to subprocess 320.

In a first implementation, only a single touchpoint is collected. In this implementation, the operator may utilize an input to cancel the touchpoint received in the preceding iteration of subprocess 310. When the operator cancels the touchpoint, the decision is "Yes" in subprocess 315, and process 300 returns to subprocess 310 so that a new touchpoint can be generated. Once the operator is satisfied with the touchpoint, the operator may utilize an input to confirm the touchpoint received in the preceding iteration of subprocess 310. When the operator confirms the touchpoint, the decision is "No" in subprocess 315, and process 300 proceeds to subprocess 320.

In a second implementation, a predetermined number of touchpoints is collected. In this implementation, the operator may be permitted to cancel and/or confirm touchpoints in the same manner as in the first implementation described above. Once the predetermined number of touchpoints has been received over iterations of subprocess 310, and optionally confirmed by the operator via an input, the decision is "No" in subprocess 315, and process 300 proceeds to subprocess 320.

In a third implementation, an arbitrary number of touchpoints is collected. In this implementation, the operator may perform as many iterations of subprocess 310 as desired until the operator is satisfied with the collection of touchpoints. Once the operator is satisfied with the current collection of touchpoints, the operator may utilize an input to confirm the current collection of touchpoints. When the operator confirms the current collection of touchpoints, the decision is "No" in subprocess 315, and process 300 proceeds to subprocess 320. In this implementation, process 300 may enforce a minimum number (e.g., one, three, four, etc.) of touchpoints. If the minimum number of touchpoints has not yet been collected, the operator may be prevented from confirming the current collection of touchpoints, such that the decision is always "Yes" in subprocess 315, until the current collection of touchpoints contains at least the minimum number of touchpoints.

In an alternative embodiment, the collection of touchpoints may be automated. In this case, an autonomous system of machine 110 may automatically control work implement 130 to contact a pattern of points on the ground. The pattern may comprise a set of points (e.g., X, Y coordinates) in the machine plane. For each point in the pattern, the autonomous system of machine 110 may move bucket 136 above the X, Y coordinate and then lower bucket 136 until bucket 136 contacts the ground (e.g., as determined by a measure of hydraulic pressure) to determine the Z coordinate, and then generate a touchpoint for the X, Y, Z coordinate. In an embodiment, the set of points may include points on the boundary of a region in which machine 110 has maximum mechanical advantage (MMA) and/or points within this MMA region. If bucket 136 is used outside of the MMA region, digging is less stable, less durable, less productive, less efficient, and/or less safe.

In subprocess 320, one or more terrain parameters are determined. The terrain parameters may comprise an estimated terrain surface. In particular, a best-fit surface may be computed from the touchpoint(s) received over one or more iterations of subprocess 310. A plurality of touchpoints represents a point cloud to which a surface can be algorithmically fit. Any suitable surface-fitting algorithm may be used to estimate the terrain surface from the plurality of touchpoints, including, without limitation, a polynomial fitting algorithm, a least-squares fitting algorithm, a spline fitting algorithm, a Kriging interpolation algorithm, a finite element algorithm, or the like. In an embodiment, the best-fit surface with maximum curvature may be estimated as the terrain surface. It should be understood that, when computing the terrain surface, points in areas without touchpoints will be extrapolated from neighboring areas that have touchpoints. Prior to the calculation of the best-fit surface, the touchpoints may be smoothed (e.g., by averaging areas with dense touchpoints, removing outliers, etc.) to reduce noise.

It should be understood that implementations with three or fewer touchpoints may not require a complex surface-fitting algorithm. In the first implementation that utilizes only a single touchpoint, the terrain surface may be a predetermined surface that is positioned relative to the touchpoint. For example, the terrain surface may be defined as the predetermined surface, at a predetermined orientation with respect to the machine plane, such that a reference point in the predetermined surface is positioned at the single touchpoint. The reference point may be a center of the predetermined surface, a corner of the predetermined surface, or the like.

In an embodiment, the boundary of the terrain surface may be determined based on the touchpoints. In the first implementation that utilizes only a single touchpoint, the boundary of the predetermined surface, when positioned according to the reference point and/or predetermined orientation, is the boundary of the terrain surface.

In the second implementation that utilizes a predetermined number of touchpoints, the boundary of the terrain surface may be defined with each touchpoint representing a vertex (e.g., corner) in the boundary. In other words, the boundary of the terrain surface is defined to include the plurality of touchpoints. Thus, the operator can manually specify the boundary of the terrain surface.

In the third implementation that utilizes an arbitrary number of touchpoints, the boundary of the terrain surface may be defined to include at least a subset of the touchpoints (e.g., as vertices), as a boundary with predetermined dimensions that encircles all of the touchpoints when projected onto the machine plane (e.g., based on X, Y coordinates), as the boundary that encircles all of the touchpoints when projected onto the machine plane while having the minimum area, or the like.

In an embodiment, the terrain surface is constrained to the MMA region for machine 110. In this embodiment, any points outside of the MMA region may be excluded from the terrain surface, even when touchpoints exist outside of the MMA region. However, touchpoints outside the MMA region may still be used when computing the terrain surface, since they may inform the computation of the terrain surface near the boundary of the MMA region.

Alternatively or additionally, the terrain surface may be constrained in other manners. For example, the operator may enable or disable certain regions (e.g., the fore, aft, left, and right quadrants) around machine 110. In this case, the terrain surface may include any of the enabled regions, subject to the selected touchpoints and any other constraints (e.g., MMA region), but will exclude all of the disabled regions.

In addition to the terrain surface, the one or more terrain parameters may comprise additional parameters. These additional parameters may include, without limitation, a type or composition of material to be dug (e.g., dirt, gravel, sand, etc.), a dig path to follow during the dig operation, a depth to which to dig below the terrain surface (e.g., representing a target surface), a width and/or length to dig, an angle of repose, a setback, a position of the dump site at which to dump the material, the number of bucket loads to remove during the dig operation, the dig rate (e.g., number of bucket loads per unit of time), a total payload (e.g., in terms of weight) to be removed by the dig operation, a type of haul vehicle being used as the dump site (e.g., to be used to determine a total payload to be removed by the dig operation), a maximum time to continue the dig operation or a time at which to stop the dig operation, a sidewall type (e.g., stepped bench, angled bench, vertical, etc.), a headwall angle, and/or the like. The additional parameters may be derived from the estimated terrain surface, the output of one or more sensors 152, a computation based on other terrain parameters, operator inputs, a manual exemplar dig operation from which certain parameters (e.g., depth to which to dig, width and/or length to dig, etc.) are automatically derived, and/or the like.

As mentioned above, the additional parameters may comprise an angle of repose for the material to be dug. The angle of repose for a material is the steepest angle of descent or dip relative to the horizontal plane to which the material can be piled without slumping. The angle of repose may be specified by the operator via an input (e.g., with validation to ensure the value is within a reasonable range), derived based on a material (e.g., looked up in a table that is indexed by material) that is specified by the operator via an input, fixed as a predefined angle, or determined in some other manner. If specified by the operator, the angle of repose may be incremented to include a margin for safety.

As mentioned above, the additional parameters may comprise a setback for machine 110. The setback is the minimum safe horizontal distance between a target terrain surface (i.e., the terrain surface after a dig operation) and machine 110 (e.g., the closest point of ground-engaging members 126). The setback may be specified by the operator via an input (e.g., with validation to ensure the value is within a reasonable range), derived based on the model of machine 110 and/or a material (e.g., looked up in a table that is indexed by machine 110 and/or material, computed based on the mass of machine 110, the force equation, and/or the like), set as a fixed value, or determined in some other manner.

In subprocess 330, a two-dimensional visual representation of the terrain surface, determined in subprocess 320, is generated. In particular, an internal representation of the terrain surface, which may be three-dimensional, may be projected onto a two-dimensional surface representing an image plane of a camera 156. In other words, three-dimensional points in the terrain surface are mapped to pixels in the image plane of camera 156. It should be understood that this image plane corresponds to the camera view (e.g., at remote terminal 190) being streamed from camera 156. Thus, the three-dimensional terrain surface is mapped onto the two-dimensional camera view. This mapping may be performed using perspective projection, based on the intrinsic parameters (e.g., optical center, focal length, etc.) and extrinsic parameters (e.g., position of camera 156 in three-dimensional space, orientation of camera 156 in three-dimensional space, etc.) of camera 156. Essentially, the extrinsic parameters are used to transform coordinates from the machine or world coordinate system to the camera coordinate system, and the intrinsic parameters are used to transform coordinates from the camera coordinate system to the pixel coordinate system. Perspective projection is well-known in the art, and therefore, will not be described in detail herein.

In subprocess 340, the camera view is augmented with the two-dimensional visual representation of the terrain surface generated in subprocess 330. For example, the projected two-dimensional terrain surface may be rendered as an overlay on one or more image frames captured by camera 156, including potentially all of these image frames or a subset of these image frames (e.g., according to a frame rate), to augment the image frame(s). The augmented image frames are substituted into the video in place of the corresponding raw image frames, to produce the camera view that is displayed on display(s) 192 of remote terminal 190 and/or on a display console in cabin 122.

In an embodiment, the visual representation of the terrain surface in the camera view may depict one or more terrain parameters. For example, the representation of the terrain surface may comprise a grid, wireframe, or other mesh whose lines indicate the value of a terrain parameter at each point on the terrain surface. For example, a higher point in a line, at a given distance from machine 110, may indicate a higher value of the terrain parameter, and a lower point in a line may indicate a lower value of the terrain parameter. In an intuitive implementation, the terrain parameter is the elevation or height of each point in the terrain surface, relative to a reference frame (e.g., the initial terrain surface, the target surface, the machine plane, a fixed plane, etc.). In this case, the lines of the mesh are contoured to the elevations of points on the three-dimensional terrain surface determined in subprocess 320. Thus, the operator can easily see the three-dimensional contours of the estimated terrain surface.

Additionally or alternatively, the visual representation of the terrain surface may comprise a heatmap with color gradations and/or intensity gradations that represent the relative values of a terrain parameter at each point across the terrain surface. For example, a color on one end of a color spectrum (e.g., violet, blue, or green) may represent a value on one end of a value range for the terrain parameter, whereas a color on the opposite end of the color spectrum (e.g., red) may represent a value on the opposite end of the value range for the terrain parameter. It should be understood that any value within the value range may be represented by a color at a position within the color spectrum that is proportional to that value's position within the value range. The terrain parameter may include elevation relative to the reference frame (e.g., from red to green and/or high intensity to low intensity, as elevation decreases), a density of the material (e.g., from red to green and/or high intensity to low intensity, as density decreases, which may be interpolated using the density of material at each touchpoint), a confidence of the estimated elevation (e.g., with white and/or transparency indicating points with insufficient data and/or confidence levels below a threshold), or the like. Alternatively or additionally, color and/or intensity gradations may be used to represent crumbs (e.g., colored red) remaining on the terrain surface and/or avoidance zones representing regions of the terrain surface that should not be dug (e.g., colored black).

In an embodiment, the operator may specify one or more terrain parameters, to be represented in the visual representation of the terrain surface, from among a plurality of available terrain parameters. For example, the operator may utilize one or more inputs to toggle the mesh on and off, select which terrain parameter to be represented by the heatmap, toggle crumbs on and off, toggle avoidance zones on and off, and/or the like. Different terrain parameters may be implemented as different layers, which can be toggled on and off by the operator via the one or more inputs. In addition, gradations of color may be used to represent the values of a first terrain parameter, whereas gradations of intensity may be used to simultaneously represent the values of a second terrain parameter that is different from the first terrain parameter. In such an embodiment, up to three different terrain parameters may be depicted, simultaneously, in the same two-dimensional visual representation: (1) a first terrain parameter represented by the contours of the mesh; (2) a second terrain parameter represented by color; and/or (3) a third terrain parameter represented by intensity.

In an embodiment in which the color and/or intensity gradations represent elevation, it may not be necessary for the mesh to match the contours of the three-dimensional terrain surface. In this case, the mesh may represent a flat surface or have a predefined shape. Alternatively, the shape of the mesh may be used to reflect a terrain parameter, other than elevation, such as the density of the material, the confidence of the elevation estimate, or other terrain parameter (e.g., selectable by the operator).

In subprocess 350, the dig operation may begin. The dig operation may be autonomous. As used herein, the term "autonomous" encompasses both fully autonomous operation (i.e., requiring no operator intervention or oversight) and semi-autonomous operation (e.g., requiring some operator intervention or oversight). The autonomous dig operation may be triggered by the operator utilizing one or more inputs to switch from a manual mode to an autonomous mode.

The autonomous dig operation may be performed by one or more software modules executed on ECU 150, platform 180, and/or remote terminal 190. Any autonomous digging algorithm may be used to implement the autonomous dig operation. In an embodiment, the algorithm may receive one or more of the terrain parameters, determined in subprocess 320, as input, and perform the autonomous dig operation based on the received terrain parameter(s). For example, the algorithm may receive an internal representation of the three-dimensional terrain surface, the densities of the materials at points on the three-dimensional terrain surface, the dig depth, the dig width, an internal representation of the target surface, and/or the like, and use these parameters to determine each location at which to dig, calculate how many buckets worth of material to remove at each location, plan an optimal path through all locations (e.g., based on dig width and/or depth, the known width and/or depth of bucket 136, etc.), and/or the like. The algorithm may then control work implement 130 (e.g., by controlling one or more hydraulic cylinders, electrical switches, valves, etc. to move the various components of work implement 130) to perform the dig operation according to the planned path through the location.

In subprocess 355, it is determined whether or not an update to the terrain surface needs to be performed. In an embodiment, an update to the terrain surface is determined to be needed each time that a bucket of material is removed (e.g., upon each lift of bucket 136, each drop by bucket 136, or the like), as determined, for example, from the output of linkage sensors 152 on work implement 130. Alternatively, an update may be determined to be needed periodically upon each expiration of a fixed time interval (e.g., 0.1 seconds), such that updates to the terrain surface are performed in near real time. When an update to the terrain surface needs to be performed (i.e., "Yes" in subprocess 355), process 300 proceeds to subprocess 360. Otherwise, when no update to the terrain surface needs to be performed (i.e., "No" in subprocess 355), process 300 proceeds to subprocess 380.

In subprocess 360, the terrain surface is updated based on a model. The model may comprise a model that simulates the flow of material (e.g., soil, gravel, sand, etc.). Sensors 152 may be used proprioceptively to maintain an accurate estimate of the motion of bucket 136 as bucket 136 interacts with the terrain. Subprocess 360 may use the model of material flow and the output of one or more linkage sensors 152 (e.g., the positions and/or motions of bucket 136, current weight of bucket 136, etc.), along with known dimensions of bucket 136 (e.g., width and depth, volume, capacity for the material, weight when empty, etc.) to estimate the amount of material (e.g., in terms of weight, volume, etc.) that is removed each time that bucket 136 is lifted. The internal representation of the three-dimensional terrain surface may be updated based on the amount of material that is estimated to have been removed with each bucket. This may comprise updating a point within the terrain surface that represents the location from which the determined amount of material was removed. Updating a point may comprise reducing the elevation (e.g., Z-coordinate) of that point in proportion to the amount of material that was removed at that point. For example, a value, representing the determined amount of material, may be subtracted from the current value of elevation at the point.

Different models of material flow may be associated with different materials (e.g., soil, gravel, sand, etc.). For example, a first material may be associated with a first model, and a second material may be associated with a second model. When the dig operation is being performed on the first material, subprocess 360 may update the terrain surface based on the first model, and when the dig operation is being performed on the second material, subprocess 360 may update the terrain surface based on the second model. Based on the material (e.g., specified by the operator), the appropriate model may be retrieved and utilized in subprocess 360.

Notably, the terrain surface can be updated without collecting new touchpoints or other three-dimensional points on the changing terrain surface. Rather, subprocess 360 may estimate each change to the terrain surface based on knowledge about the location on the terrain surface from which a bucket of material was removed (e.g., based on sensors 152), the model of material flow, which may estimate the amount of material removed with each bucket and/or how the material settles after the removal of a bucket of material (e.g., based on angle of repose), and/or the like.

Alternatively, additional touchpoints could be collected during the dig operation. In an automatic implementation, machine 110 may occasionally acquire a new touchpoint by placing bucket 136 at a certain point on the ground, within the boundaries of the terrain surface, and determining the three-dimensional coordinates, as in subprocess 310. In the event that subprocess 310 collects touchpoints automatically based on a pattern, touchpoints may be collected at certain times during the autonomous dig operation using the same pattern, a similar pattern, a subset of the pattern, or the like. Alternatively or additionally, touchpoints may be collected as needed or arbitrarily. The times at which touchpoint(s) are automatically collected during the autonomous dig operation may include each time bucket 136 touches the ground to remove dirt, periodically according to a time interval, each time that a number of dig cycles has been completed, after each completion of an iteration of a dig cycle or path, whenever the model of material flow outputs a parameter value (e.g., elevation value) with a low confidence (e.g., a confidence value below a certain threshold) for a point on the terrain surface (in which case a touchpoint may be collected at that point), and/or the like.

Alternatively or additionally, additional touchpoints could manually be collected during the dig operation. For example, during the autonomous dig operation, an operator (e.g., remote operator) may utilize an input to temporarily switch machine 110 from the autonomous mode to the manual mode. The operator may then control work implement 130, in the manual mode, to contact a point on the ground and utilize an input to collect a new touchpoint as in subprocess 310. The operator may do this iteratively to collect any number of touchpoints. This may be useful whenever the operator notices that the representation of the terrain surface on the camera view is no longer matching the reality of the terrain surface visible in the camera view.

Whether additional touchpoints are collected automatically or manually, the internal representation of the three-dimensional terrain surface may be updated based on the new touchpoints. For example, the new touchpoints may be combined with any other points on the current three-dimensional terrain surface, and a best-fit surface may be generated from the combined set of points, in the same manner as in subprocess 320. Thus, the internal representation of the three-dimensional terrain surface is updated in real time to reflect deformation of the actual, physical terrain surface during the autonomous dig operation. It should be understood that any new touchpoints may comprise the same information as the initial touchpoints collected in subprocess 310, including the three-dimensional coordinates, the density of material (e.g., determined from hydraulic pressure on bucket 136), and/or the like.

In subprocess 370, the two-dimensional visual representation of the terrain surface, by which the camera view has been augmented, is updated. Subprocess 370 may comprise re-projecting the internal representation of the three-dimensional terrain surface, as updated in subprocess 360, onto the image plane. Alternatively, subprocess 370 may comprise updating the two-dimensional visual representation of the terrain surface directly. In either case, the result of subprocess 370 is that the camera view is updated to reflect the updated terrain surface.

In subprocess 380, it is determined whether or not the dig operation has ended. When the dig operation has ended (i.e., "Yes" in subprocess 380), process 300 ends. Otherwise, when the dig operation has not ended (i.e., "No" in subprocess 380), process 300 returns to subprocess 355 to determine whether or not another update to the terrain surface needs to be performed. When an autonomous dig operation ends, machine 110 may be automatically switched back from the autonomous mode to the manual mode.

To summarize process 300, subprocesses 310-340 define an internal representation of a three-dimensional terrain surface and visually represent this terrain surface in a two-dimensional camera view. Once the autonomous dig operation begins in subprocess 350 and until the autonomous dig operation ends in subprocess 380, both the three-dimensional internal representation and the two-dimensional visual representation of the terrain surface are continually updated in subprocesses 355-370. These updates are performed by monitoring proprioceptive sensors 152 on machine 110 to measure bucket operations and estimate the amount of material moved by these bucket operations according to a model of material flow. These updates may also be performed by collecting new touchpoints and recalculating the three-dimensional internal representation of the terrain surface.

In an embodiment, an operator could, at any time (e.g., during the dig operation, after the dig operation has been suspended, etc.), clear the internal representation of the three-dimensional terrain surface, in order to redefine the terrain surface. For example, the operator may select an input that clears the previous definition of the terrain surface. In this case, process 300 may be reset to subprocess 310. This may be useful whenever the operator determines that the current terrain surface is invalid. Alternatively or additionally, this reset could occur automatically in response to one or more triggering events, such as an automatic determination that the current terrain surface has become invalid. The current terrain surface may be deemed invalid when machine 110 has moved, when a new region is to be dug, when the terrain surface has deviated too much from reality (e.g., determined visually by the operator, determined automatically via new touchpoints, etc.), and/or the like.

Figure 4:
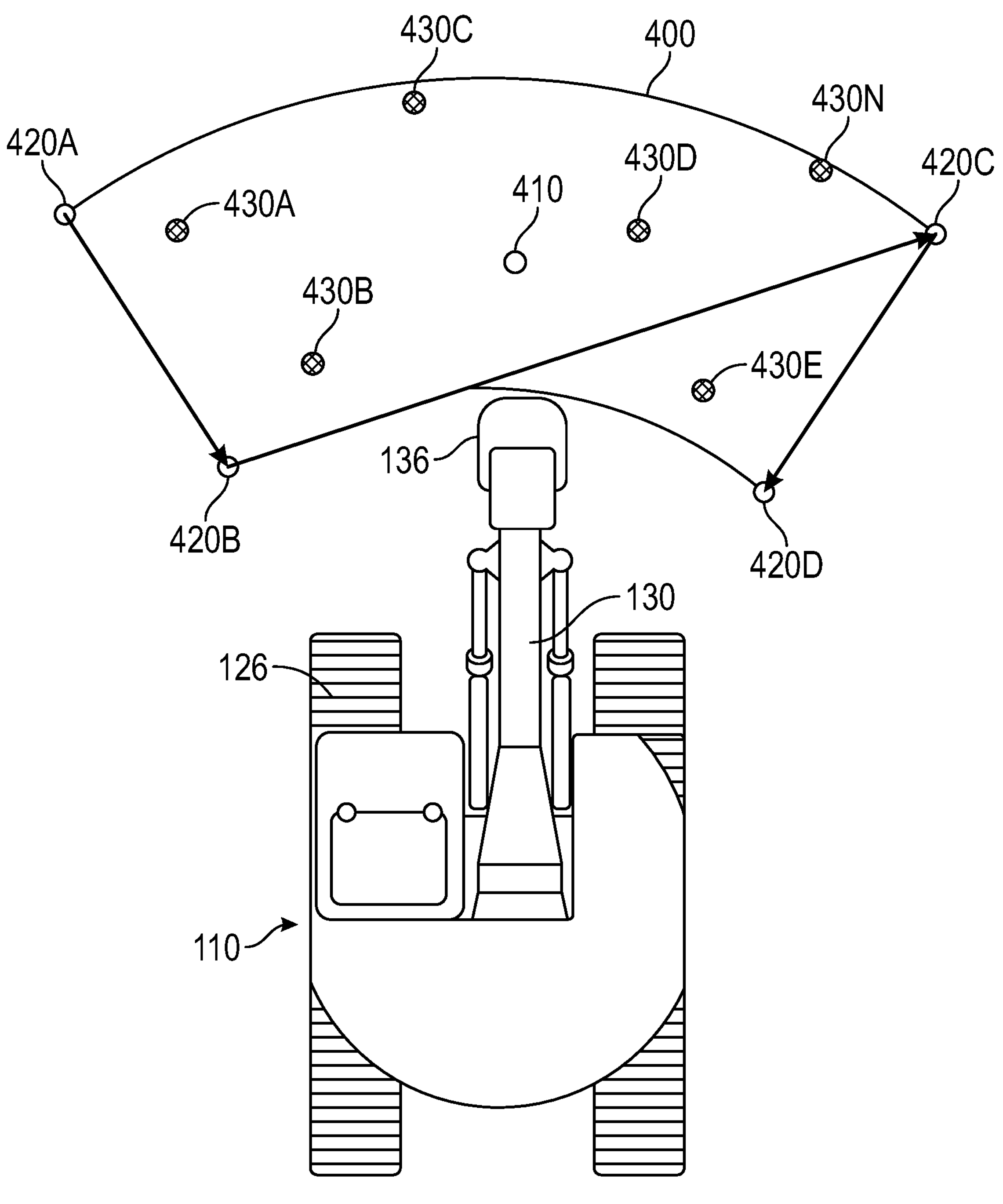
FIG. 4 illustrates examples of touchpoint collection, according to an embodiment.

FIG. 4 illustrates examples of an implementation of subprocess 310, according to an embodiment. As discussed above, according to various implementations, a terrain surface 400 may be defined based on one touchpoint, a predetermined number of touchpoints, or an arbitrary number of touchpoints, optionally with a minimum number of touchpoints and/or constrained to an MMA region.

In the first implementation in which only a single touchpoint is collected, the operator may touch work implement 130 (e.g., bucket 136) to point 410. Point 410 may then be used as a reference point to define the boundary of terrain surface 400 in the machine plane. For example, terrain surface 400 may be defined as a predetermined surface, such as a mound with a specified angle of repose, with point 410 at the center. However, it should be understood that the reference point does not have to be the center of the predetermined surface. For example, the reference point could instead be a corner of the predetermined surface (e.g., terrain surface 400 could be defined with one of touchpoint 420A, 420B, 420C, or 420D as the reference point).

In the second implementation in which a predetermined number of touchpoints is collected, the operator may touch work implement 130 (e.g., bucket 136) to a set of points that define the boundaries of the desired terrain surface 400 in the machine plane. For example, the operator may control bucket 136 to touch four corners of terrain surface 400. Alternatively, the autonomous system of machine 110 may automatically touch four corners of a predetermined region (e.g., MMA region). In either case, bucket 136 may be controlled to touch point 420A at a first corner, move and touch point 420B at a second corner, move and touch point 420C at a third corner, and move and touch point 420D at a fourth corner. The boundary of terrain surface 400 may be defined as an annulus sector with points 420A, 420B, 420C, and 420D, collectively referred to herein as points 420, at the four corners. If the boundary represents the MMA region, the boundary of terrain surface 400 may be a sector of an annulus around the axis of rotation of work implement 130.

In an alternative of the second implementation, the operator may control bucket 136 to touch two corners of terrain surface 400, and the boundary of terrain surface 400 may be defined as a region with these two points at the two corners. For example, the two corners may be two diagonal corners (e.g., 420A and 420D, or 420B and 420C), the farthest two corners (e.g., 420A and 420C), or the nearest two corners (e.g., 420B and 420D). The boundary of terrain surface 400 may be a sector of an annulus around the axis of rotation of work implement 130 with the selected pair of corners.

The second implementation is not limited to any particular number of touchpoints. For example, more than four touchpoints may be generated. In this case, the boundary of terrain surface 400 may be a shape (e.g., polygon) that is defined by setting each of the touchpoints as a vertex and connecting the vertices with edges, such that no edges intersect each other. In this case, the boundary consists of the vertices and edges.

In the third implementation in which an arbitrary number of touchpoints is collected, the operator may touch work implement 130 (e.g., bucket 136) to an arbitrary set of points to define the desired terrain surface 400. For example, the operator may control bucket 136 to touch points 430A, 430B, 430C, 430D, 430E, . . . 430N, collectively referred to herein as points 430. Terrain surface 400 may be defined as a minimum region, MMA region, or other region that encompasses all of these touchpoints, and a best-fit surface in the MMA region may be generated from all of these touchpoints. In an embodiment, the operator may be required to acquire a minimum number of touchpoints 430, but is free to acquire more than the minimum number of touchpoints 430 (e.g., with or without a maximum).

It should be understood that two or more of these implementations may be combined. For example, the first implementation may be combined with the third implementation, such that the operator must define the boundary of terrain surface 400 in the machine plane by touching a reference point (e.g., 410), and then may touch an arbitrary number of other points (e.g., 420 or 430) within the boundary to more accurately define terrain surface 400 for the surface-fitting algorithm. Similarly, the second implementation may be combined with the third implementation, such that the operator must define the boundary of terrain surface 400 in the machine plane by touching two or four corners (e.g., 420), and then may touch an arbitrary number of other points (e.g., 430) within the boundary to more accurately define terrain surface 400 for the surface-fitting algorithm.

Figure 5:
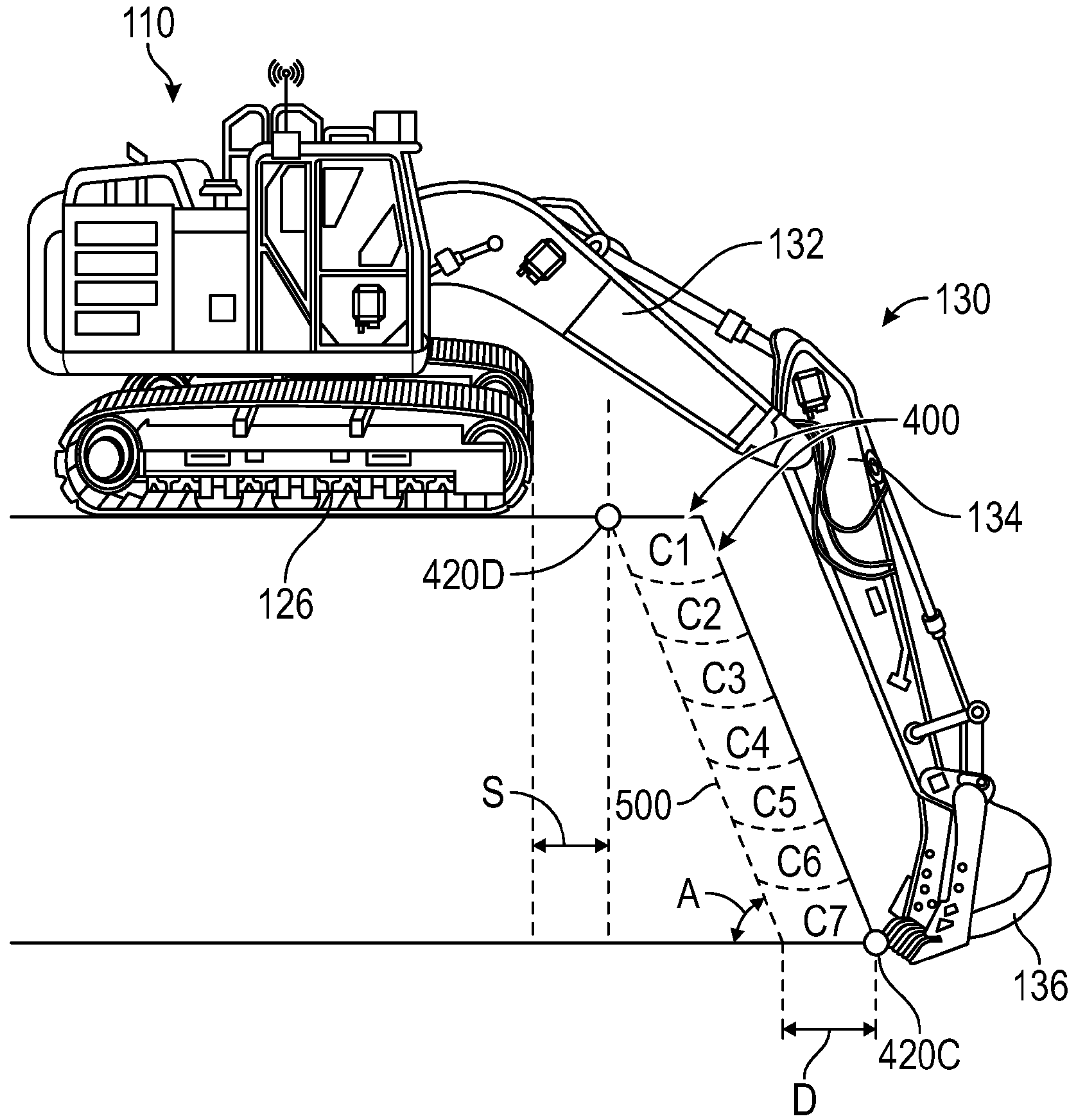
FIG. 5 illustrates an example of a dig operation, according to an embodiment.

FIG. 5 illustrates an example of a dig operation, according to an embodiment. In this example, machine 110 is perched on a bench to perform a dig operation on a sloped sidewall. Terrain surface 400 includes this sloped sidewall. The dig operation may be set to dig to a target surface 500. Target surface 500 may be defined as a depth D below terrain surface 400, the end of a setback S between the slope and the front of ground-engaging members 126, and/or the like. Notably, target surface 500 has an angle of repose A.

During a first dig cycle, machine 110 may autonomously utilize work implement 130 to remove material along cut C1. It should be understood that after work implement 130 is controlled to pick up material, work implement 130 may be controlled to rotate and dump the material at a dump site (e.g., another region, a haul truck, a wash plant, etc.). After each bucket of material is picked up from cut C1, terrain surface 400 may be updated in subprocess 360 based on the model, and the representation of terrain surface 400 in the camera view may be updated in subprocess 370. This process is repeated over a second dig cycle (e.g., to remove cut C2), a third dig cycle (e.g., to remove cut C3), and so on and so forth (e.g., to remove cuts C4, C5, C6, and C7), until the entirety of target surface 500 has been exposed. Once all dig cycles have been completed, the dig operation may end (e.g., subprocess 380).

During the dig operation, the operator may occasionally inspect the camera view to identify any discrepancies between the visual representation of terrain surface 400 and reality. If there are any discrepancies, the operator may perform or initiate one or more remedial actions. These remedial actions may include diagnosing the cause of the discrepancies, suspending the autonomous dig operation and taking temporary manual control to resolve the discrepancies (e.g., by defining new touchpoints, manually digging, moving machine 110, etc.), terminating the dig operation, resetting the dig operation, recalibrating settings, and/or the like.

After the dig operation ends, the operator may inspect the camera view to identify any discrepancies between target surface 500 and reality. If there are any discrepancies, the operation may perform or initiate one or more remedial actions. For example, if crumbs remain on target surface 500 or some regions of target surface 500 are still buried (e.g., because the material in those regions turned out to be denser than expected), the operator may take manual control of machine 110 and utilize work implement 130 to remove the remaining material.

Figure 6:
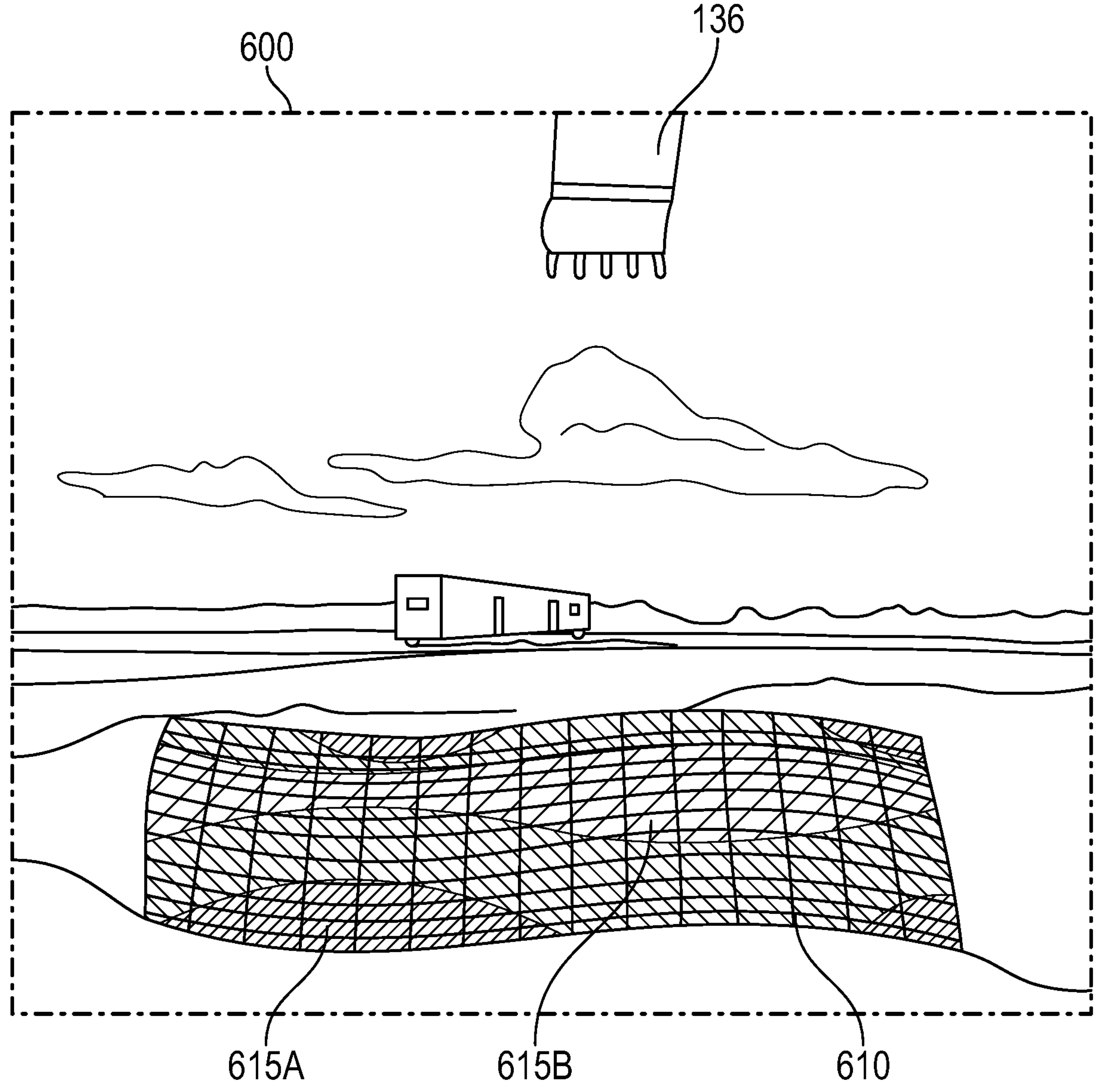
FIG. 6 illustrates an example of a camera view with an overlaid representation of a terrain surface, according to an embodiment.

FIG. 6 illustrates an example of a camera view with an overlaid representation of a terrain surface, after an implementation of subprocess 340, according to an embodiment. In particular, camera view 600 is augmented with a representation 610 of terrain surface 400. Notably, bucket 136 is visible in camera view 600. The camera view may be configured such that bucket 136 is always visible, in order to improve the safety of remote operations.

In this example, representation 610 comprises a mesh that is contoured according to the elevation or height of points in the estimated terrain surface 400. In addition, representation 610 is colored and/or depicted with varying intensities, according to the value of a terrain parameter at points on the estimated terrain surface 400. The terrain parameter may be elevation with respect to some reference plane, the density of the material, or the like. The gradations of color and/or intensity represent the value of the terrain parameter. For example, region 615A may have a different value for the terrain parameter than region 615B. Thus, an operator can easily discern the values of the terrain parameter across terrain surface 400, by viewing the differences in the color and/or intensity across terrain surface 400.

Figure 7:
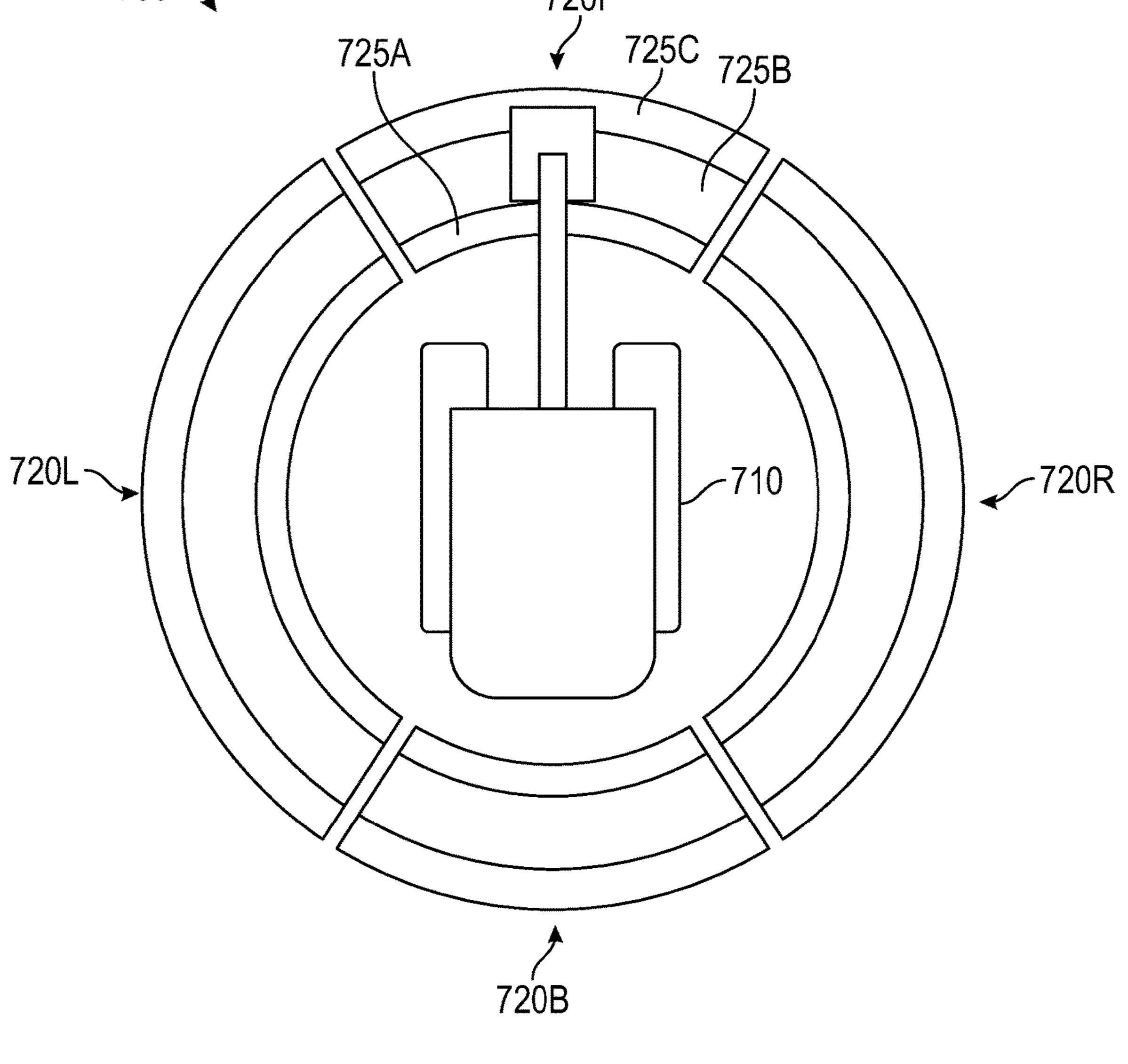
FIG. 7 illustrates an example of a representation of a terrain surface, according to an embodiment.

FIG. 7 illustrates an example of a non-perspective representation 700 of a terrain surface, according to an embodiment. Representation 700 may be used instead of or in addition to representation 610. Representation 700 comprises a visual machine representation 710 of machine 110, encircled by four visual quadrant representations 720F, 720B, 720L, and 720R, collectively referred to herein as visual quadrant representations 720, representing quadrants of the terrain surface surrounding machine 110.

Visual quadrant representations 720 may comprise portions of a circular region around visual machine representation 710. Each visual quadrant representation 720 may comprise a plurality of stacked arcs, illustrated as arcs 725A, 725B, and 725C, which may be collectively referred to herein as arcs 725. Each arc 725 represents a region of the terrain surface that is at a different distance from machine 110. For example, arc 725A represents the region closest to machine 110, arc 725C represents the region farthest from machine 110, and arc 725B represents the region between the closest and farthest regions. It should be understood that, although only three arcs 725 are illustrated and each visual quadrant representation 720 consists of the same number of arcs 725, representation 700 could comprise any number of arcs 725 per visual quadrant representation 720, including only a single arc 725, and/or could comprise different numbers of arcs 725 for different visual quadrant representations 720.

Each arc 725 may be colored to indicate progress from the initial terrain surface 400 to the final target surface 500. For example, the color red may indicate little progress (e.g., 0%-33% of the way to target surface 500), the color yellow may indicate moderate progress (e.g., 34%-66% of the way to target surface 500), and the color green may indicate significant progress or completion (e.g., 67%-100% of the way to target surface 500). Alternatively, the color red could indicate no progress (i.e., 0%), the color yellow could indicate in-progress (e.g., greater than 0% and less than 100%), and the color green could indicate completion (e.g., 100%).

Notably, this is a less granular and more primitive manner of visually depicting the terrain surface. In an alternative embodiment, there may be a single arc 725 for each visual quadrant representation 720, but the arc 725 may comprise gradations of color and/or intensity, with different regions of the arc 725 having a different color and/or intensity than other regions, depending on the digging progress or other terrain parameter in that region. In other words, representation 700 could be similar to representation 610, except that representation 700 is a top-down, non-perspective view of terrain surface 400 that is independent of camera view 600.

In yet another alternative embodiment, representation 700 may comprise any number of annular sectors or other segmented regions around visual machine representation 710, a contiguous disk or other shape around visual machine representation 710, or any other representation of a terrain surface around machine 110. In any case, the region or regions around visual machine representation 710 may comprise gradations of color and/or intensity, as described above, to represent one or more terrain parameters of the terrain surface represented by those region(s), such as elevation, density of material, progress towards target surface 500, and/or the like.

INDUSTRIAL APPLICABILITY

Autonomous systems enable a machine 110, such as an excavator, to dig in a specified area with little to no human intervention. However, conventional autonomous systems require costly exteroceptive systems, such as LIDAR, to monitor the terrain surface during the autonomous dig operation. In contrast, disclosed embodiments can monitor the terrain surface with proprioception, thereby eliminating the need for costly exteroceptive systems.

An initial terrain surface 400 may be defined by an operator or autonomous system touching points on the ground with a work implement 130. Three-dimensional coordinates can be determined for each touchpoint using the output of sensors 152 (e.g., linkage sensors) on work implement 130. A best-fit terrain surface 400 can be estimated from these touchpoints, and projected onto a two-dimensional camera view, so that terrain surface 400 can be visualized on a display, such as display(s) 192 of a remote terminal 190.

During the dig operation, the visual representation 610 of terrain surface 400 can be updated based on the output of sensors 152 and a model of the flow of material out of and/or within terrain surface 400. In addition, new touchpoints may be automatically or manually collected during the dig operation, and terrain surface 400 may be recalculated using the new touchpoints to improve the accuracy of visual representation 610.

At the end of the dig operation, an operator may utilize visual representation 610 to determine regions of terrain surface 400 that require additional work. For example, visual representation 610 may comprise a mesh and/or gradations of color and/or intensity that distinguish regions which deviate from a target surface 500. Thus, the operator may easily identify these regions and responsively perform a remedial action, such as manually controlling machine 110 to clean up these regions.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of machine. Hence, although the present embodiments are, for convenience of explanation, depicted and described as being implemented in an excavator, it will be appreciated that it can be implemented in various other types of machines capable of excavation, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A method comprising:

using at least one hardware processor to:

generate a plurality of touchpoints from an output of one or more linkage sensors on a machine, wherein each of the touchpoints comprises a three-dimensional coordinate, and wherein the output represents a characteristic of a work implement of the machine resulting from touching a ground surface with the work implement while at least a portion of the machine remains stationary relative to the ground surface and prior to performing a dig operation with the work implement;

determine a terrain surface of the ground surface from the touchpoints;

generate a two-dimensional visual representation of the terrain surface by projecting the terrain surface onto an image plane; and output to a display the two-dimensional visual representation of the terrain surface overlaid on a camera view, wherein the two-dimensional visual representation is observable during the dig operation with the work implement.

2. The method of claim 1, further comprising using the at least one hardware processor to receive an angle of repose, wherein determining the terrain surface comprises defining the terrain surface as a mound having the angle of repose, and wherein one touchpoint is at a center of the mound.

3. The method of claim 1, wherein determining the terrain surface comprises defining a boundary of the terrain surface to include the plurality of touchpoints.

4. The method of claim 3, wherein the boundary is defined to include the touchpoints at vertices of the boundary.

5. The method of claim 1, wherein determining the terrain surface comprises computing a best-fit surface from the plurality of touchpoints.

6. The method of claim 1, wherein determining the terrain surface comprises constraining the terrain surface to a region of maximum mechanical advantage associated with the machine.

7. The method of claim 1, further comprising using the at least one hardware processor to, during the dig operation by the machine, over one or more iterations:

update the terrain surface based on the output of the one or more linkage sensors and a model of material flow; and update the two-dimensional visual representation based on the update to the terrain surface.

8. The method of claim 7, wherein updating the terrain surface comprises, for at least one position on the terrain surface:

determining that material has been removed from the position based on the output of the one or more linkage sensors;

in response to determining that material has been removed from the position, estimating an amount of material that has been removed from the position; and decreasing an elevation of one or more points at the position based on the estimated amount of material that has been removed.

9. The method of claim 8, wherein the amount of material that has been removed is estimated based on the model of material flow.

10. The method of claim 8, wherein the amount of material that has been removed is estimated based on one or more dimensions of a bucket of the work implement.

11. The method of claim 1, wherein the two-dimensional visual representation comprises a mesh with lines contoured to elevations of the terrain surface.

12. The method of claim 11, wherein the two-dimensional visual representation comprises gradations of color, and wherein the gradations of color represent relative values of a terrain parameter across the terrain surface.

13. The method of claim 11, wherein the two-dimensional visual representation comprises gradations of intensity, and wherein the gradations of intensity represent relative values of a terrain parameter across the terrain surface.

14. The method of claim 11, wherein the two-dimensional visual representation comprises gradations of color and gradations of intensity, wherein the gradations of color represent relative values of a first terrain parameter across the terrain surface, wherein the gradations of intensity represent relative values of a second terrain parameter across the terrain surface, and wherein the second terrain parameter is different from the first terrain parameter.

15. The method of claim 1, wherein at least one of the one or more linkage sensors measures a position of a component of the work implement relative to another component of the machine.

16. The method of claim 15, wherein the work implement comprises a boom, a stick, and a bucket, and wherein the one or more linkage sensors measure a position of each of the boom, the stick, and the bucket, relative to another component of the machine.

17. The method of claim 1, further comprising using the at least one hardware processor to perform the dig operation autonomously by automatically:

generating one or more additional touchpoints;

redetermining the terrain surface based on the one or more additional touchpoints; and updating the two-dimensional visual representation of the terrain surface based on the redetermined terrain surface.

18. A system comprising:

at least one hardware processor; and software that is configured to, when executed by the at least one hardware processor, generate touchpoints from an output of one or more linkage sensors on a machine including a ground engaging member configured to drive the machine across a ground surface, wherein each of the touchpoints comprises a three-dimensional coordinate, and wherein the output represents a characteristic of a work implement of the machine resulting from touching a ground surface without movement of the machine across the ground surface by the ground engaging member before use of the work implement to perform a material removal operation, determine a terrain surface of the ground surface from the touchpoints, generate a two-dimensional visual representation of the terrain surface by projecting the terrain surface onto an image plane, and display on a display a camera view with the two-dimensional visual representation of the terrain surface overlaid thereon.

19. The system of claim 18, wherein the at least one hardware processor is configured to define a boundary of the terrain surface which includes the touchpoints at vertices of the boundary.

20. A non-transitory computer-readable medium having instructions stored thereon, wherein the instructions, when executed by a processor, cause the processor to:

generate touchpoints from an output of one or more linkage sensors on a machine, wherein each of the touchpoints comprises a three-dimensional coordinate, and wherein the output represents a characteristic of a work implement of the machine resulting from touching a ground surface with the work implement when at least a portion of the machine is at rest relative to the ground surface over which the machine is configured to move, wherein the generating occurs prior to performing digging of the ground surface with the work implement;

determine a terrain surface of the surface from the one or more touchpoints;

generate a two-dimensional visual representation of the terrain surface by projecting the terrain surface onto an image plane; and output to a display a camera view and the two-dimensional visual representation of the terrain surface overlaid onto the camera view prior to the digging of the ground surface with the work implement.

* * * * *